United States Patent [19]
Chiang et al.

[11] Patent Number: 6,028,584
[45] Date of Patent: Feb. 22, 2000

[54] REAL-TIME PLAYER FOR PANORAMIC IMAGED-BASED VIRTUAL WORLDS

[75] Inventors: Cheng-Chin Chiang; Chun-Wei Hsieh; Tse Cheng, all of Hsinchu, Taiwan

[73] Assignee: Industrial Technology Research Institute, Taiwan

[21] Appl. No.: 08/920,760

[22] Filed: Aug. 29, 1997

[51] Int. Cl.[7] ....................................................... G09G 5/00
[52] U.S. Cl. ............................................................. 345/118
[58] Field of Search ...................................... 345/118, 121, 345/425, 419, 430, 431; 395/125, 127

[56] References Cited

U.S. PATENT DOCUMENTS

| | | |
|---|---|---|
| 5,179,638 | 1/1993 | Dawson et al. .......................... 395/125 |
| 5,204,944 | 4/1993 | Woldberg et al. ........................ 395/127 |
| 5,224,208 | 6/1993 | Miller, Jr. et al. ........................ 395/125 |
| 5,396,583 | 3/1995 | Chen et al. ............................... 395/127 |

*Primary Examiner*—Richard A. Hjerpe
*Assistant Examiner*—Ronald Laneau
*Attorney, Agent, or Firm*—Fish & Richardson P.C.

[57] ABSTRACT

A method and apparatus for displaying a selected portion of a panoramic image onto a view plane is provided. The method provides an environment map in the form of a plurality of pixel values representative of the panoramic image. A first portion of the pixel values representative of a selected first area of the panoramic image is mapped to a projection buffer. A second portion of the first portion of pixel values, representative of a desired area of the panoramic image to be viewed is mapped to the view plane. The view plane is displayed on the display.

12 Claims, 5 Drawing Sheets

*Texture Mapping*

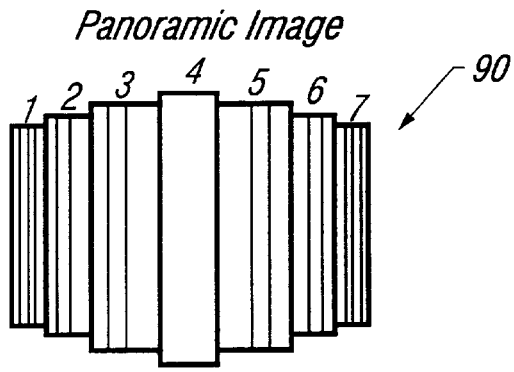
FIG. 9A
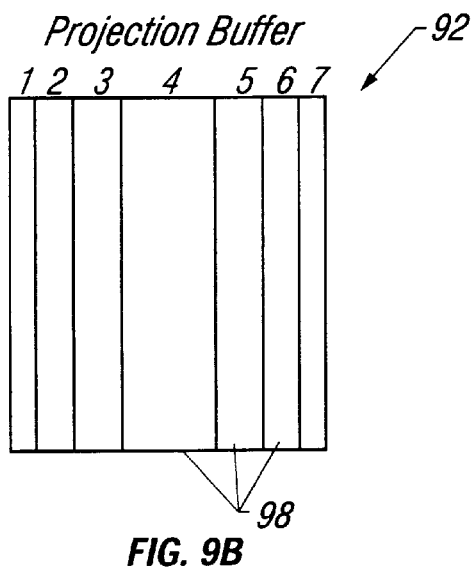
FIG. 9B
| Rectangle Slice ID | Panoramic Image Upper-left corner | Lower-Right corner | Panoramic Buffer Upper-left corner | Lower-Right corner |
|---|---|---|---|---|
| 1 | | | | |
| 2 | | | | |
| 3 | | | | |
| 4 | | | | |
| 5 | | | | |
| 6 | | | | |
| 7 | | | | |
Lookup Table
FIG. 9C

REAL-TIME PLAYER FOR PANORAMIC IMAGED-BASED VIRTUAL WORLDS

BACKGROUND OF THE INVENTION

The invention relates to obtaining different views of images in an image-based virtual environment.

Technologies for rendering high-quality graphics and images in real time are important to the success of virtual reality. In virtual reality applications, users can navigate freely within computer synthesized worlds. To render virtual worlds, computers are used to transform the three dimensional coordinates of objects to a two dimensional coordinate space view plane (e.g., computer screen). Inevitably, the power of computers restricts the complexity of virtual worlds being designed.

For this reason, another approach, termed "image-based rendering technology", was proposed to reduce the impact of computing power on the design of virtual worlds. This new approach uses an image or collection of images, called an environment map, which characterizes the appearance of a scene when viewed from a particular position. The environment map contains the pixel values used to display a scene. The image environment map is first wrapped onto an object surface having a certain geometry, such as a cube, a sphere, or a cylinder. Afterwards, by locating the viewing position at the geometrical center of the wrapped object, perspective-corrected views of scenes can be reconstructed from the image on the object surface during playback. For example, in an article written by Greene, entitled "Environment Mapping and Other Applications of World Projections," IEEE Computer Graphics and Applications, Vol. 6, No. 11, pages. 21–29, November 1986, six images on the faces of a cube are used as the environment map.

The basic technique for producing the perspective-corrected scene is to project a desired portion of the wrapped environment map onto a view plane, for example, the computer screen. The mathematical mapping from the wrapped environment map to the view plane depends on the geometry of the object surface and the position of the view plane in world space.

The approach provided by image-based virtual reality technology is well-suited for building virtual worlds having complex backgrounds because the time needed to render the image-based world is generally independent of the complexity of the virtual world.

One type of environment map is the spherical map. Spherical mapping mechanisms are described in U.S. Pat. Nos. 5,359,363, 5,384,588, 5,313,306, and 5,185,667, all of which are incorporated herein by reference. The major advantage of spherical mapping systems is that the environment map is able to provide users with 360 degrees of both horizontal and vertical pannings of views within the mapped sphere. However, a common problem with spherical mapping systems relates to image acquisition. Generally, to acquire the image for a spherical environment map, users usually require special and relatively expensive cameras having fish-eye lenses.

The unlimited range of panning with spherical mapping systems is an attractive feature. However, this feature is not always necessary in certain virtual reality applications. For example, it may not be necessary to have an unlimited vertical field of view. Thus, cylindrical mapping systems are often used to view an environment map. Cylindrical mapping systems provide 360 degrees of horizontal panning, but only a limited range of vertical panning. A method and apparatus for generating perspective views of a scene from a cylindrical environment map are described in U.S. Pat. No. 5,396,583, issued to Chen et al. (hereafter Chen), which is incorporated herein by reference. The device developed by Chen allows the user to pan the viewing window horizontally without limit and vertically within a limited range.

With a cylindrical mapping system, users can generate an image environment map by stitching together the pictures taken at surrounding scenes with a rotatable camera fixed at a tripod. Digital image processing software is available for accomplishing the stitching process.

Rendering an environment map can also be accomplished using a technique called "texture mapping". In texture mapping, a digitized or synthesized image texture is mapped onto a surface represented by surface values (u,v). For example, with a spherical environment map, the sphere is first rendered into a lookup table which is the same size as the final image. In other words, the table includes a (u,v) entry for every pixel. The "u" index is along the equator; while the "v" index is between the poles. Conceptually, this process is analogous to placing a decal on a solid object. The rectangular texture image resides in its own (u,v) coordinate space, and the surface resides in the three-dimensional world space $(X_w, Y_w, Z_w)$. When rendered on a view plane (e.g., computer screen), the world space coordinates of the surface are transformed to screen coordinates $(X_s, Y_s)$.

In virtual reality applications, users usually prefer the ability to freely navigate to obtain different views of scenes. However, the large number of coordinate transformations for doing so require substantial computation power, thereby significantly degrading the performance of real-time playback on low-cost personal computers. For this reason, current panoramic image-based virtual reality applications usually fix the users' viewing position at the center of the panoramic image to simplify the coordinate transformations. Users can pan the view directions vertically and horizontally from this viewing position.

Referring to FIG. 1, a side view of a conventional process, known as dewarping for projecting an object surface 10 onto a view plan 12, is shown. The radius of a cylinder 14 upon which a panoramic image is displayed is denoted as r, and the distance from a viewing position 16 to the view plane 12 is denoted as d. The radius r can be easily calculated by dividing the circumference of the cylinder by $2\pi$. The vertical rotation angle of the view plane 12 is denoted as $\phi$. Horizontally rotating the view plane 12 around the panoramic image on the cylinder 14 achieves the horizontal view rotation. Vertically rotating the view plane 12 achieves vertical panning of the view. Changing the distance d between the viewing position 16 and the view plane 12 achieves the zoom-in or zoom-out operations. Because d and $\phi$ remain unchanged, the geometry of the projected portion of the panoramic image remains the same for any longitude.

The scenes also can be zoomed in or out by changing distance d between the viewing position and the view plane. However, even with this restriction on the viewing position, there are still a large number of computations needed when the user continuously changes browsing conditions. Fortunately, for cylindrical panoramic mapping systems, the coordinate transformations can be further simplified due to the regularity of the cylinder geometry. Moreover, certain accelerating techniques can be applied to their coordinates' transformations. Chen, for example, describes a table-lookup technique which includes recording the projected position, e.g., starting point and ending point, for each vertical (or horizontal) scanline of a view plane. The table-lookup technique is based on scanline coherence of a cylindrical environment map. By scanline coherence, it is meant that the relationship between the scanlines in the cylindrical environment and those in the view plane have a regular or ordered relationship. Thus, mappings between portions of the environment map and view plane may be performed by simple scaling calculations. Basically, the entries in a lookup table include the texture coordinate (u,v) values, for the starting point of each vertical scanline on the view plane. Due to the coherence of the cylindrical environment map, the lookup table need not be recalculated during horizontal view rotations. The only requirement is to offset or scale the u value by a constant value for each scanline to achieve desired horizontal panning of views. However, during vertical view rotation or zoom-in/zoom-out operations, the lookup table changes. In particular, the entries in the lookup table are required to be recalculated to find the new starting position and ending position on the image texture for each scanline. These recalculations result in a decrease of the playback speed.

SUMMARY OF THE INVENTION

The present invention provides a method and system for displaying a selected portion of a panoramic image with reduced computations, thereby accelerating the speed at which a synthesized virtual world can be viewed and browsed. The method and system utilize an environment map in the form of a plurality of pixel values representative of the panoramic image and a projection buffer which allows the user to pan the image without requiring a substantial number of computations.

In one aspect of the invention, a first portion of the pixel values representative of a selected first area of the panoramic image is mapped to a projection buffer. A second portion of the first portion of pixel values, representative of a desired area of the panoramic image to be viewed is mapped to the view plane. The view plane can then be displayed on the display.

In another aspect of the invention, a system for implementing the approach described above is provided. The system includes a video memory which stores a plurality of pixel values representative of the panoramic image and has a first bit-mapped area representing a projection buffer and a second bit-mapped area representing the view plane. The system also includes an input device which identifies a first portion of the panoramic image desired to be viewed; and a microprocessor which maps, to the first bit-mapped area, a portion of the pixel values representative of a selected first area of the panoramic image. The system further includes a video processor which maps, to the second bit-mapped area and in response to commands from the microprocessor, a second portion of the first portion of pixel values, representative of a desired area of the panoramic image to be viewed; and a video display which displays a second portion of the panoramic image.

Embodiments of these aspects of the invention may include one or more of the following features.

The environment map is wrapped on an object surface having a particular geometry. For example, the panoramic image is wrapped onto a hypothetical cylinder. In this embodiment, the first area of the panoramic image (which is mapped onto the projection buffer) represents a horizontal view of the panoramic image from a viewing position lying along a longitudinal axis of the hypothetical cylinder and at a midpoint of the height of the cylinder. The projection buffer lies along a tangent of the cylinder and between the viewing position and the view plane.

The pixel values representative of the panoramic image are ordered in a first plurality of scanlines. Similarly, the first portion of the pixel values representative of the selected first area of the panoramic image are ordered in a second plurality of scanlines and the second portion of the first portion of pixel values are ordered in a third plurality of scanlines. The second plurality of scanlines form a first rectangular area and the third plurality of scanlines form a second rectangular area, smaller than the first rectangular area.

The step of mapping a second portion of the first portion of pixel values includes calculating starting and ending points of each of the third plurality of scanlines. The step of mapping a first portion of the pixel values representative of a selected first area of the panoramic image includes generating a lookup table having entries corresponding to starting and ending points of each of the second plurality of scanlines. Alternatively, the step of mapping a first portion of the pixel values representative of a selected first area of the panoramic image includes generating a lookup table having entries corresponding to grouped sets of neighboring ones of the second plurality of scanlines. In this case, the second plurality of scanlines of each grouped set have the same starting and ending positions. The number of neighboring ones of the second plurality of scanlines in each grouped set can also be dynamically changed allows for different levels of image quality during browsing.

In other words, when the browsing speed is very fast, degradation in the rendered image quality is not nearly as noticeable as rendered during low-speed browsing. Thus, the present invention provides a technique which automatically determines the rendering qualities depending on the browsing speed, thereby achieving better frame rates for playback.

In general, the invention provides an efficient rendering technique and system for environment mapping systems. In particular, the invention requires fewer entries for the lookup table and minimizes the number of recalculations for lookup table generation during browsing. The system also permits using accelerating functions of video cards efficiently.

Other features and advantages will become apparent from the following description, and from the claims.

BRIEF DESCRIPTION OF THE DRAWINGS

FIG. 9A is a representation of an exemplary panoramic image.

FIG. 9B is a projection buffer corresponding to the panoramic image of FIG. 9A.

FIG. 9C is a lookup table corresponding to the panoramic image and projection buffer of FIGS. 9A and 9B, respectively.

DESCRIPTION

Figure 1:
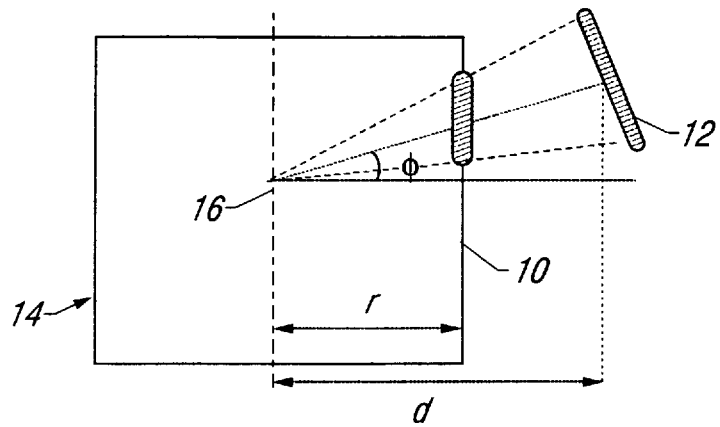
FIG. 1 is a diagrammatic side view of a cylindrical environment map with respect to a view plane.
Figure 2:
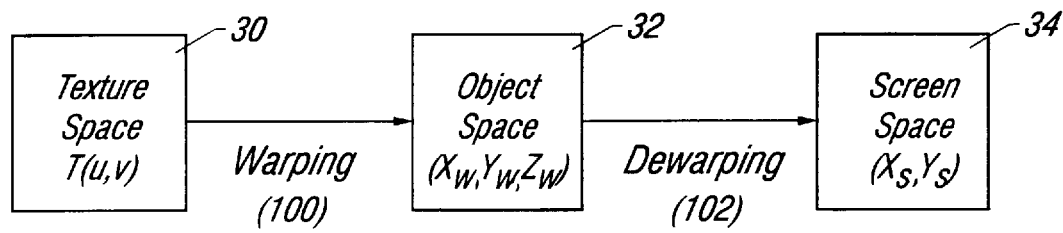
FIG. 2 is a flowchart describing the basic steps of texture mapping of the present invention.

Referring to FIG. 2 the texture mapping process of the invention involves two steps. The first step (100) is to map texture coordinates from a texture space 30 onto an object surface 32 in a warping process. A suitable warping process is described in 3D *Computer Graphics* by Alan Watt, Addison-Wesley, Inc., 1993, pp. 238–246, which is hereby incorporated by reference. With a warped panoramic image, it is important during playback to project a desired portion of the panoramic image onto the computer screen to provide perspective-corrected views. Thus, the second step (102) is a projection process, referred to as dewarping, for projecting the image of the object surface 32 onto a view plane or screen 34.

In a cylindrical image-based virtual reality application, the object surface 32 is a hypothetical cylinder. Because the background image of one panorama vista is usually a static scene, the first step of mapping texture coordinates onto an object surface can be performed during the authoring of the virtual world. In other words, the background image is wrapped around the hypothetical cylinder before playing. There are two approaches for accomplishing this step. The first approach is to use a special camera, for example, the Globuscore 35 mm camera available from Globuscope, Inc., New York, to capture the panoramic pictures of the surrounding scene. The other approach is to use a conventional camera that is fixed on a tripod. The camera is horizontally rotated at constant angle increments and pictures are taken at the different views of the surrounding scenery.

The picture taken at each view must partially overlap pictures taken of neighboring views. With this overlapping, commercially available software, e.g., QuickTime® VR authoring tool suite, from Apple Computer Inc., can be used to stitch these pictures together to produce the panoramic images. The QuickTime® VR authoring tool suite software is described by Chen in his article entitled "QuickTime® VR—An Image-Based Approach to Virtual Environment Navigation", Computer Graphics Proceeding, Annual Conference Series 1995, which is incorporated herein by reference. Regardless of which approach is adopted, however, the panoramic image will be warped to some extent.

Second step (102) includes a new dewarping process that employs a table-lookup technique to determine an optimum playing speed. A lookup table is generally used to record the starting point and ending point for each vertical scanline. Hence, the number of recorded scanlines is equal to the width of the view plane. Position-independent data may be stored in the look-up table to decrease the amount of work required in recalculating the table. The final mapped position of each scanline is then determined by combining (usually multiplying and adding) the position-independent data with the position-dependent data. The new dewarping process which is described below reduces the size of the lookup table to minimize computations and storage requirements.

Figure 3A:
FIGS. 3A and 3B are projected panoramic images corresponding to changing the view plane from $\phi=0°$ to $\phi=45°$, respectively.
Figure 3B:

There are two situations that require the recalculation of lookup table entries. The first situation occurs when the distance (d) between the viewing position and view plane changes (zoom-in or zoom-out) while the second situation occurs when the vertical rotation angle ($\phi$) of the view plane changes (vertical panning). For example, referring to FIGS. 3A and 3B, projected panoramic images corresponding to changing the view plane from $\phi=0°$ to $\phi=45°$ for a fixed value of d are shown, respectively. During user browsing, these two situations occur quite frequently. To reduce the amount of CPU time required for recalculating the lookup table entries, a projection buffer is used.

Figure 4:
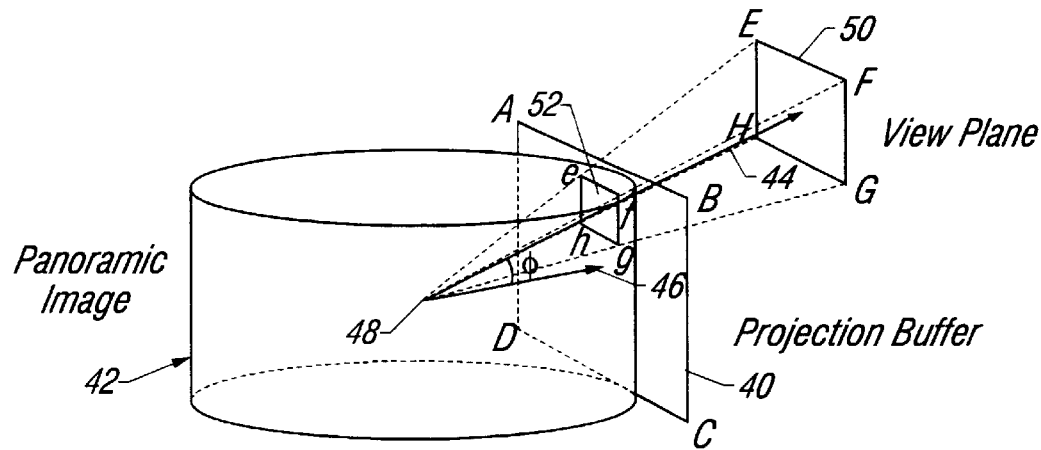
FIG. 4 illustrates the geometry of a cylindrical environment map with respect to a projection buffer and view plane in accordance with the present invention.

Referring to FIG. 4, a projection buffer 40, represented by rectangle ABCD, is hypothetically positioned to be tangent to a cylinder upon which the panoramic image 42 is wrapped and normal to the view direction (represented by arrow 44). The height of projection buffer 40 is equal to the height of the panoramic image, and a center 46 of projection buffer 40 is as high as a viewing position 48. A view plane 50, represented by rectangle EFGH has dimensions specified by the user. However, to avoid unnecessary clipping of rendered images, the width of projection buffer 40 must be larger than or equal to the width of view plane 50.

The dewarping process involves two steps. The first step is to project the desired portion of panoramic image 42 onto projection buffer 40 using the lookup table. The second step is to project a desired portion of projection buffer 40 onto view plane 50. Because the distance from the viewing position to the projection buffer is a constant (i.e., the radius r of the panoramic image) and projection buffer 50 does not move in the vertical direction, it is unnecessary to update the lookup table during browsing. During vertical view panning, the present invention shifts the view plane up or down by the angle $\phi$ with view plane 50 maintained parallel with projection buffer 40. However, since the height of panoramic image 42 is typically limited in height due to the limited field of view of camera, the effects of vertical panning achieved by the present invention and previous approach have very few differences. Using projection buffer 40 and view plane 50 together in this manner, the shape of the projected area from the projection buffer to the view plane is a rectangular shape, independent of the value of angle $\phi$. In other words, vertical panning is achieved by projecting a desired rectangular area 52 (represented by rectangle efgh) from projection buffer 40 to view plane 50. The desired rectangular area is determined by locating the upper-left and lower-right corners of the rectangular area of projection buffer 40. Thus, recalculating the lookup table entries is not required unless the dimensions of projection buffer 40 are changed which occurs only upon changing the size of view plane 50. During projection from projection buffer 40 to view plane 50, the position (upper-left and lower-right corners) of source rectangular area 52 on projection buffer 40 can be easily determined based on the values of d and $\phi$ and the dimensions of view plane 50.

Figure 5:
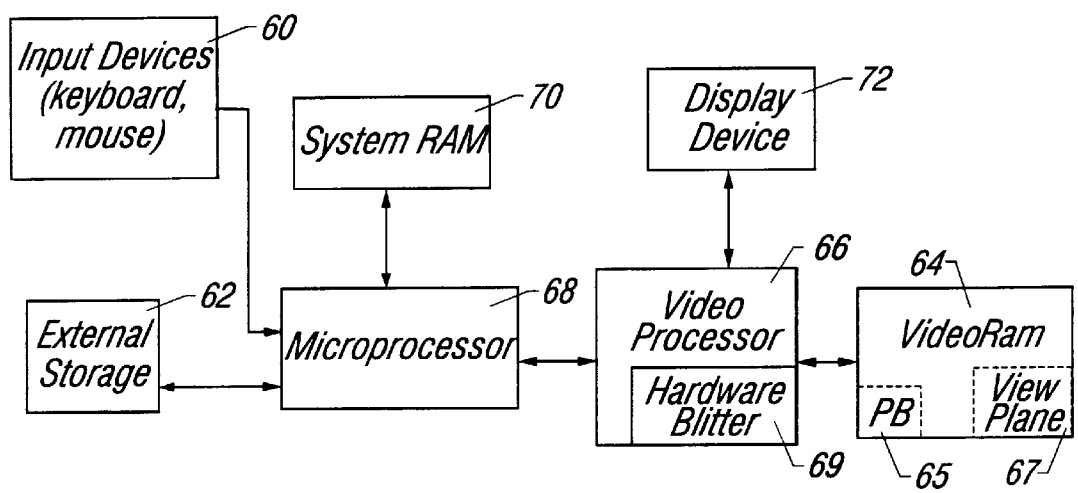
FIG. 5 is a block diagram of a computer system used to implement the method of the present invention.

Referring to FIG. 5, a computer architecture, represented in block diagram form, for implementing the real-time player apparatus and method described above is shown. An input device 60 serves as an input interface between users and the player. For example, users can use a mouse to control the horizontal and vertical panning operations. Zooming-in and zooming-out operations can be controlled by using specified keys on a keyboard. The panoramic image 42 (FIG. 4) is initially stored in an external storage 62 such as a hard disk. During initialization, the player loads panoramic image 42 into a video RAM 64 associated with a video processor 66. A microprocessor 68 updates a lookup table, which is stored in a system RAM 70, and used for the dewarping process described above. Video processor 66 receives data, such as from the lookup table, as well as specified commands received from microprocessor 68. Projection buffer 40 (FIG. 4) is an area 65 of offscreen memory that resides in video RAM 64. The view plane is a bit-mapped area 67 of video RAM 64 for a display device 72.

Figure 6:
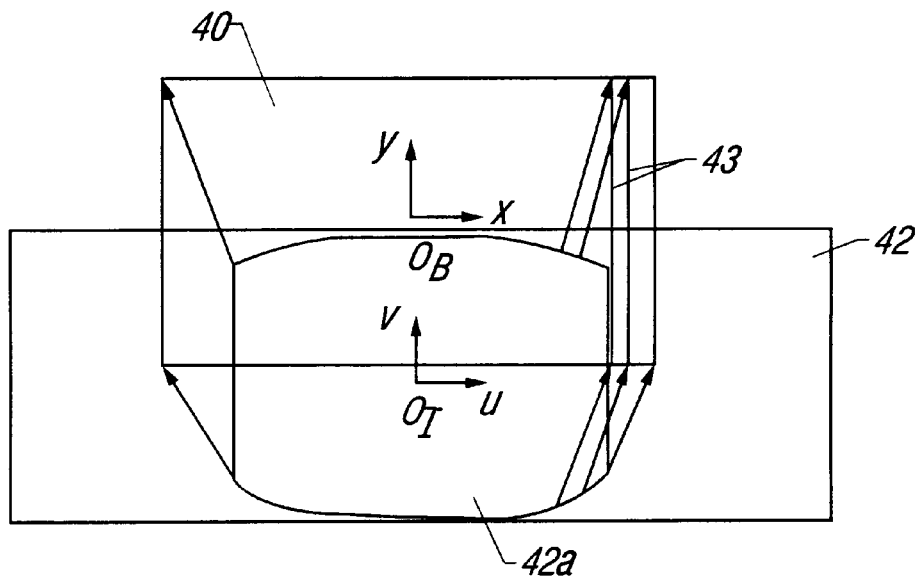
FIG. 6 illustrates scanlines of the projected area of a panoramic image onto a projection buffer.

Referring to FIG. 6, the shape of the projected area from panoramic image 42 to projection buffer 40 is shown. Each vertical scanline 43 on the projection buffer corresponds to a vertical scanline 45 of a projected portion 42a of panoramic image 42. Therefore, the starting point and ending point of each projected scanline of panoramic image 42 can be recorded as entries in a lookup table. offsetting the recorded horizontal positions of all scanlines by a constant value will achieve the horizontal view panning. The mathematical mappings for the two-step projections, i.e., panoramic image 42 to projection buffer 40 and projection buffer 40 to view plane 50 can be derived using basic geometry. The mapping between projection buffer coordinates (x,y) and panoramic image (u,v) is derived using the following equations:

$$u = r\tan^{-1}(x/r)$$
$$v = yr / \sqrt{x^2 + r^2} \qquad (1)$$

where r denotes the radius of the panoramic image.

Figure 7:
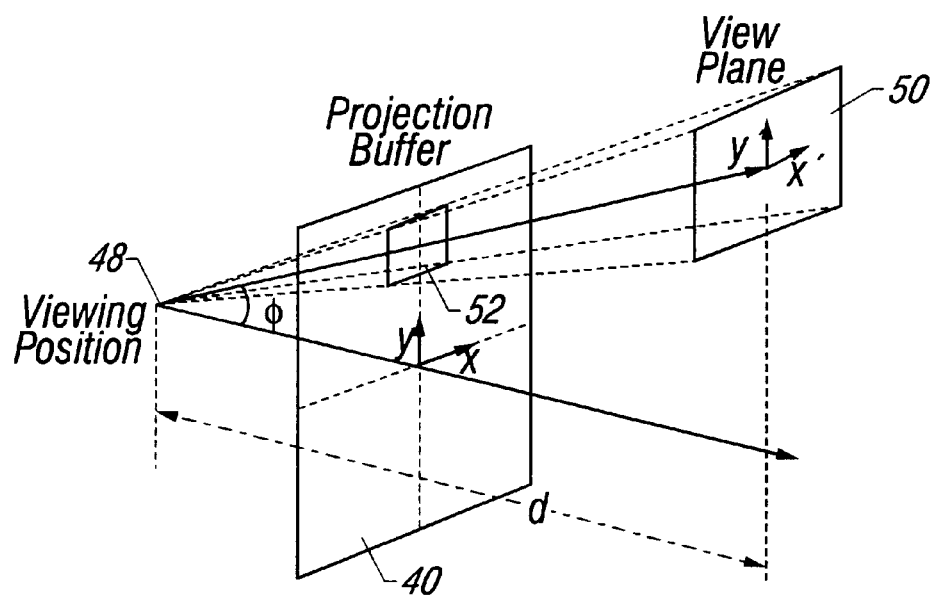
FIG. 7 is another view of the geometry of a cylindrical environment map with respect to the projection buffer and view plane of FIG. 5.

Referring to FIG. 7, the mapping between projection buffer coordinates (x,y) and view plane coordinates (x',y') is derived using the following equation:

$$y = \frac{r}{d}(y' + d\tan\phi) \text{ and } x = \frac{r}{d}x' \qquad (2)$$

where d denotes the distance between viewing position and view plane and φ denotes the angle of vertical panning.

The mapping relationship between the panoramic image, projection buffer and view plane can be represented as follows:

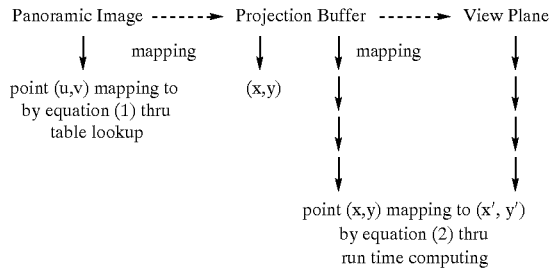

In addition to the features described above, the present invention offers other advantageous properties in high-speed image rendering.

The dewarping process of the invention can be further improved by fully utilizing bit block transfer (BITBLT) accelerating functions which are provided by many conventional graphics cards to achieve optimum real-time playing speed. These graphics cards include many hardware implemented functions for accelerating image raster operations. One of these functions, known as "blitter", performs bit block transfer (usually abbreviated as BITBLT function) of memory at very high speeds. Blitting is described in *Fundamentals of Interactive Computer Graphics*, pp. 484–485, which is hereby incorporated by reference. This hardware 69 (FIG. 5) can be used to copy a source rectangle of pixels to a specified destination rectangle area or even allow the source rectangle and destination rectangle to have different dimensions. It may be important, however, that the copy operations be independently performed using the video memory on the graphics cards so that the copy operations do not excessively occupy the bandwidth of the system data bus and the system CPU can continue to work on other tasks.

Figure 8:
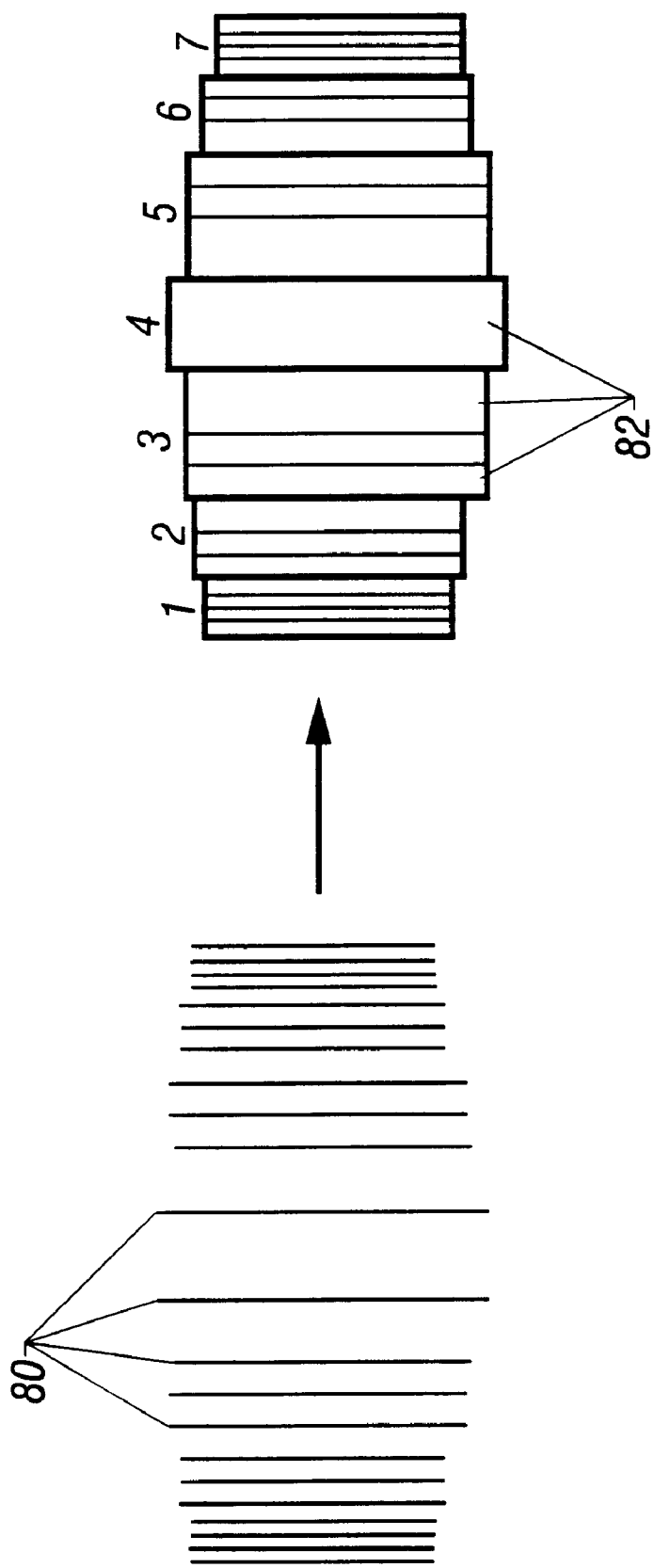
FIG. 8 illustrates the grouping of neighboring scanlines into rectangular areas in accordance with the present invention.

With reference to FIG. 8, it may not be necessary to record individual entries of neighboring scanlines 80 in a lookup table. For example, because the neighboring scanlines 80 may share the same vertical starting and ending positions, they can be grouped to define a rectangle area 82 of the panoramic image. Hence, rather than record the individual starting and ending positions for each scanline 80, only the position of the rectangle areas 82 are recorded. In this way, the size of the lookup table is significantly reduced. Moreover, "blitting" rectangles, instead of scanlines, from a panoramic image to a projection buffer utilizes the hardware blitter 69 more efficiently. The number of blitting operations is also reduced, thereby improving playback speed.

The present invention also includes a dynamic image quality rendering technique. Unlike some conventional schemes, the image quality is not improved by using the anti-aliasing technique, although such techniques could be incorporated with the technique of the present invention. Instead, the widths of the rectangle slices (as shown in FIG. 7) formed during the projection from panoramic image to the projection buffer are dynamically changed. By classifying the user's panning speed into several levels, each speed level is associated with a different threshold number of pixels, T for the corresponding speed level. If a considered scanline and its next neighboring scanline differ in their vertical positions by more than T pixels, then this considered scan line becomes the ending scanline of the currently formed rectangle slice and its next neighboring scanline becomes the starting scanline for the next rectangle slice to be formed. If T is a small value, then more rectangle slices will be formed, and the rendered quality will be better. On the other hand, if T is large, then fewer rectangle slices are formed and a higher frame rate can be obtained at the expense of slightly reduced image quality. With the dynamic quality rendering playing mode, the lookup table requires updating when the panning speed changes from one level to another level.

Implementation Example

Referring to FIGS. 9A and 9B, for a panoramic image 90 having a size of 2976 pixels by 768 pixels, the value for the radius of cylinder (r) is calculated to be 2976/2π=473.645 pixels. Next, a projection buffer 92 having a dimension of 800 pixels by 768 pixels is provided. With projection buffer 92 of this size, the values for entries in a lookup table 94 can be calculated. As shown in FIG. 9C, the entries in lookup table 94 contain position data 96 (upper-left corner and lower-right corner) corresponding to rectangle slices 99 (FIG. 9A) diced from panoramic image 90 and position data 100 corresponding to projected rectangle slices 99 (FIG. 9B) of projection buffer 92. Depending on the panning speed selected by the user, the number of formed rectangles changes. In one implementation of the present invention, there are three speed levels, i.e., fast, medium, and slow levels. When the speed is in a slow level, the threshold T is set to 0. Thus, the number of formed rectangles is equal to the width of the projection buffer, i.e., 800. This value of threshold will provide the best rendering quality. The threshold T can also by set to 0.5 and 1.0 for medium speed level and fast speed level, respectively. Although the rendering quality degrade as increases T an improved frame rate of playback is achieved.

Other embodiments are within the scope of the claims.

What is claimed is:

1. A method of displaying a selected portion of a panoramic image onto a display, the method comprising:

providing an environment map in the form of a plurality of pixel values representative of the panoramic image, wherein the environment map represents the panoramic image wrapped onto a hypothetical cylinders;

mapping, to a projection buffer, a first portion of the pixel values representative of a selected first area of the panoramic image, wherein the first area of the panoramic image mapped onto the projection buffer represents a horizontal view of the image from a viewing position lying along a longitudinal axis of the cylinder and at a midpoint of the height of the cylinder, the projection buffer lying along a tangent of the cylinder and between the viewing position and the view plane;

mapping, to a view plane, a second portion of the first portion of pixel values, representative of a desired area of the panoramic image to be viewed; and displaying the view plane on the display.

2. The method of claim 1 wherein the plurality of pixel values representative of the panoramic image are ordered in a first plurality of scanlines, the first portion of the pixel values representative of the selected first area of the panoramic image are ordered in a second plurality of scanlines, and the second portion of the first portion of pixel values are ordered in a third plurality of scanlines.

3. The method of claim 2 wherein the second plurality of scanlines form a first rectangular area and the third plurality of scanlines form a second rectangular area smaller than the first rectangular area.

4. The method of claim 3 wherein the step of mapping a first portion of the pixel values representative of a selected first area of the panoramic image includes generating a lookup table having entries corresponding to starting and ending points of each of the second plurality of scanlines.

5. The method of claim 4 wherein the step of mapping a second portion of the first portion of pixel values includes calculating starting and ending points of each of the third plurality of scanlines.

6. The method of claim 3 wherein the step of mapping a first portion of the pixel values representative of a selected first area of the panoramic image includes generating a lookup table having entries corresponding to grouped sets of neighboring ones of the second plurality of scanlines.

7. The method of claim 6 wherein the second plurality of scanlines of each grouped set have the same starting and ending positions.

8. The method of claim 6 wherein the number of neighboring ones of the second plurality of scanlines in each grouped set is dynamically changed.

9. A system for displaying a selected portion of a panoramic image onto a view plane, the system comprising:

a video memory which stores a plurality of pixel values representative of the panoramic image wrapped onto a cylinder, the video memory having a first bit-mapped area representing a projection buffer and a second bit-mapped area representing the view plane, wherein the first area of the panoramic image mapped onto the projection buffer represents a horizontal view of the image from a viewing position lying along a longitudinal axis of the cylinder at a midpoint of the height of the cylinder, the projection buffer lying along a tangent of the cylinder and between the viewing position and the view plane;

an input device which identifies a first portion of the panoramic image desired to be viewed;

a microprocessor which maps, to the first bit-mapped area, a portion of the pixel values representative of a selected first area of the panoramic image;

a video processor which maps, to the second bit-mapped area and in response to commands from the microprocessor, a second portion of the first portion of pixel values, representative of a desired area of the panoramic image to be viewed; and a video display which displays a second portion of the panoramic image.

10. The system of claim 9 wherein the plurality of pixel values representative of the panoramic image are ordered in a first plurality of scanlines, the first portion of the pixel values representative of the selected first area of the panoramic image are ordered in a second plurality of scanlines, and the second portion of the first portion of pixel values are ordered in a third plurality of scanlines.

11. The system of claim 10 wherein the microprocessor maps the plurality of pixel values to generate a lookup table representative of a first portion of the panoramic image.

12. The system of claim 11 wherein the video processor includes hardware blitter.

* * * * *